(12) United States Patent
Elnahrawy et al.

(10) Patent No.: US 10,726,334 B1
(45) Date of Patent: Jul. 28, 2020

(54) GENERATION AND USE OF MODEL PARAMETERS IN COLD-START SCENARIOS

(71) Applicant: Amazon Technologies, Inc., Seattle, WA (US)

(72) Inventors: Eiman Mohamed Hamdy Elnahrawy, Irvine, CA (US); Vijai Mohan, Bellevue, WA (US); Eric Nalisnick, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 638 days.

(21) Appl. No.: 15/483,859

(22) Filed: Apr. 10, 2017

(51) Int. Cl.
*G06N 3/08* (2006.01)
*G06N 3/02* (2006.01)

(52) U.S. Cl.
CPC ................... *G06N 3/082* (2013.01)

(58) Field of Classification Search
CPC ............... G06N 3/082; G06N 3/0454
See application file for complete search history.

(56) References Cited

U.S. PATENT DOCUMENTS 7,155,401 B1 * 12/2006 Cragun .............. G06Q 30/02
705/7.31

OTHER PUBLICATIONS de Campos, L. M., et al., "Combining content-based and collaborative recommendations: A hybrid approach based on Bayesian networks", 2010,International Journal of Approximate Reasoning, 51, p. 785-799 (Year: 2010).*
Wu, Y., et al., "Collaborative Denoising Auto-Encoders for Top-N Recommender Systems", 2016, Proceedings of the Ninth ACM International Conference on Web Search and Data Mining,San Francisco, California, USA—Feb. 22-25, 2016, p. 153-162 (Year: 2016).*

* cited by examiner

*Primary Examiner* — Robert A Cassity
*Assistant Examiner* — Nader Metwalli
(74) *Attorney, Agent, or Firm* — Knobbe, Martens, Olson & Bear, LLP

(57) ABSTRACT

The present disclosure is directed to generating and using a machine learning model, such as a neural network, by augmenting another machine learning model with an additional parameter. The additional parameter may be connected to some or all nodes of an internal layer of the neural network. A machine learning model can determine a value associated with the additional parameter using non-behavior or non-event-based information. The machine learning model can be trained using non-behavior or non-event-based information and parameter values of the other machine learning model.

18 Claims, 6 Drawing Sheets

GENERATION AND USE OF MODEL PARAMETERS IN COLD-START SCENARIOS

BACKGROUND

Models representing data relationships and patterns, such as functions, algorithms, systems, and the like, may accept input (sometimes referred to as an input vector), and produce output (sometimes referred to as an output vector) that corresponds to the input in some way. For example, a machine learning model may be implemented as an artificial neural network ("NN"). Artificial neural networks are artificial in the sense that they are computational entities, analogous to biological neural networks in animals, but implemented by computing devices. Output in NN-based models is obtained by doing a "forward pass." The forward pass involves multiplying large NN weight matrices, representing the parameters of the model, by vectors corresponding to input feature vectors or hidden intermediate representations. In certain systems, such as systems designed to provide customized content (e.g., content with recommendations for goods and/or services) to users based on the content interaction histories of the users, NN-based models may generate probability scores via the forward pass using content interaction histories. The probability scores may indicate the probabilities of a user performing some future interaction, such as purchasing or otherwise acquiring items during a time period. The parameters of a NN can be set in a process referred to as training.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
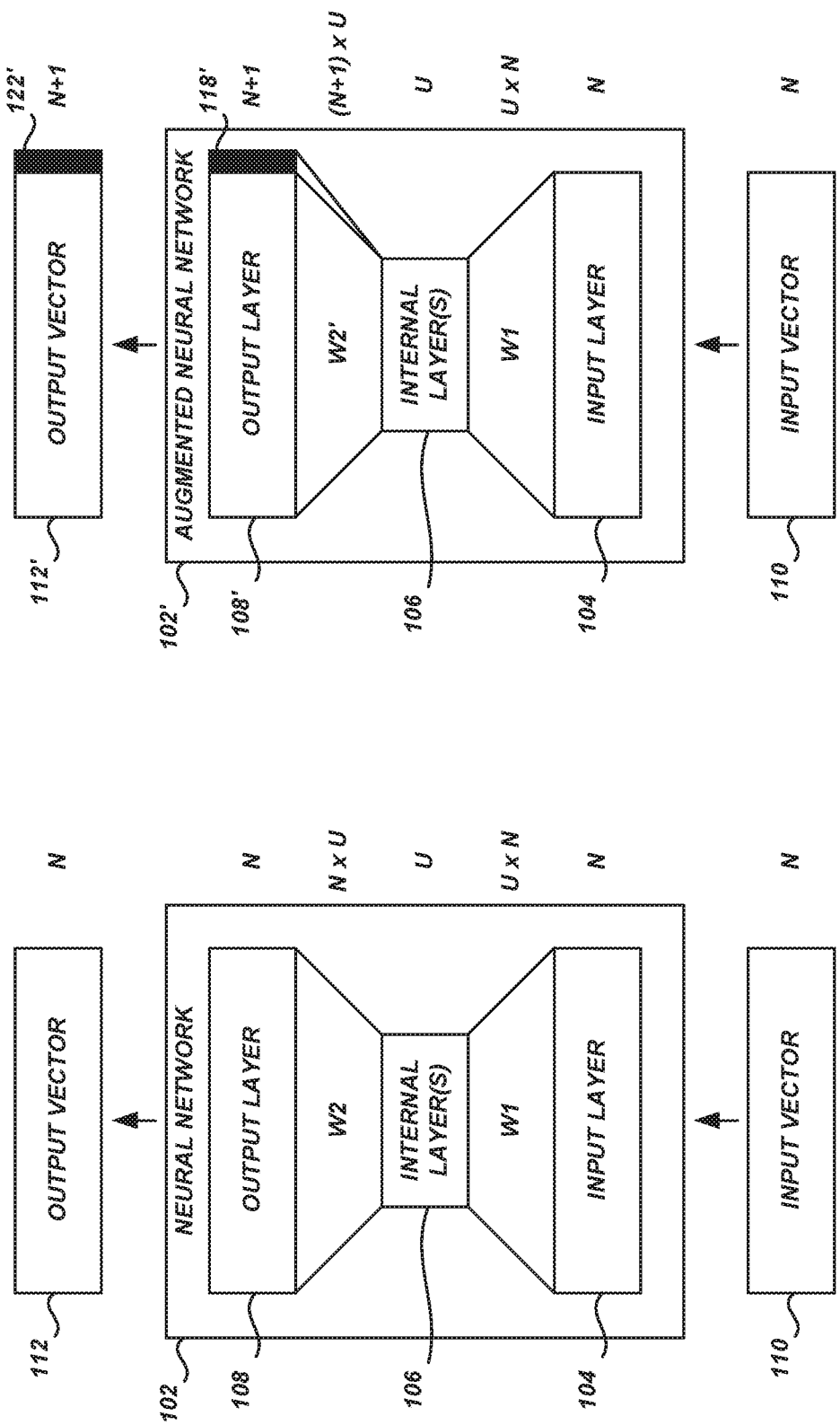
FIG. 1 is a diagram of an illustrative augmented artificial neural network generated from an illustrative artificial neural network and parameters from a companion, side, or hyper model according to some embodiments.

The present disclosure is directed to embodiments of augmenting a machine learning model with parameters generated using another machine learning model. In some embodiments, a machine learning model can be trained to determine output values based on input data regarding events. For example, the output values may be associated with the likelihood that certain future events will occur, given the occurrence of certain past or current events. If the likelihood of a new type of future event is to be predicted, there may be little or no data with which to train the model. This scenario may be referred to as a "cold start." In order to generate parameters that the machine learning model can use to predict the occurrence of new types of events from a cold start, a companion machine learning model may be used. The companion machine learning model (also referred to as a side model or hyper model) can be a machine learning model trained to generate parameters, used by other machine learning models for predicting the occurrence of new types of events. The companion machine learning model may generate the parameters based on certain similarities between the new types of events and existing events that have already been modeled. The generated parameters can then be added to another machine learning model, thereby augmenting the parameters already in use and allowing the augmented machine learning model to be used to generate output values associated with the new type of events from a cold start.

In one illustrative, non-limiting embodiment, a first machine learning model can be designed and trained to determine probabilities of existing items being purchased based on purchase histories of users of the existing items. Additionally, the parameters of the first machine learning model can be augmented to include additional parameters determined using a companion machine learning model and non-purchase information or other non-behavior information. For example, the parameters of first machine learning model can be augmented to include additional parameters associated with a new item. The new item may not be associated with behavior information of users (e.g., no user has purchased the new item right after the new item becomes available on an electronic commerce website). The companion machine learning model can determine the additional parameters, used to augment the first machine learning model, based on non-behavior information (e.g., textual information, visual information, audio information, or metadata) associated with the new item. Thus, the first machine learning model may be augmented in the absence of behavior information associated with the new item. Furthermore, the augmented machine learning model can then determine a probability of purchase of the new item by a user based on a purchase history of the user with respect to existing items. For example, the augmented machine learning model may determine a probability of purchase of a new version of an electronic device (such as on the first day of its release or prior to its release) using a purchase history of the user with respect to an earlier version of the electronic device and other existing items. As another example, the augmented machine learning model may recommend a video that is newly released without using viewing histories of other users of the video.

Some aspects of the present disclosure relate to training a companion machine learning model using parameters of a corresponding machine learning model and non-behavior information. In some embodiments, a training data input vector for training the companion machine learning model can comprise data representing non-behavior or other non-event-based information, such as textual information, associated with an existing item. A corresponding reference data output vector can comprise parameters, associated with the existing item, of the machine learning model to be augmented. Thus, the companion machine learning model may be trained to generate parameters, associated with behaviors or events related to an existing item, using non-behavior or other non-event-based information associated with the existing item. For example, the companion machine learning model can determine additional parameters associated with the new item using textual information associated with the new item. Thus, the companion machine learning model may determine, for an augmented machine learning model, additional parameters associated with the new item without using behavior information associated with the new item. Generating parameters to augment the parameters of an existing machine learning model in this way may be useful in the absence of behavior information associated with the new item (e.g., a cold start). For example, an electronic commerce website may desire to recommend the new item to users on its first day of release or even prior to its release.

Additional aspects of the present disclosure relate to methods of augmenting a machine learning model or otherwise generating an augmented machine learning model. In some embodiments, an augmented machine learning model can include all or a subset of all parameters of a corresponding existing machine learning model. For example, an augmented neural network can include an input layer, one or more internal layers, and an output layer of a corresponding neural network. The augmented machine learning model can also include the connections between the layers of the corresponding machine learning model and parameters associated with the connections. In some embodiments, an augmented machine learning model can include additional parameters determined using a companion machine learning model and non-behavior information. For example, additional parameters of an augmented neural network can include a node associated with the new item in an output layer of the augmented neural network that is absent in the corresponding neural network. The augmented neural network can include connections between the node associated with the new item in the output layer of the augmented neural network and nodes of an internal layer of the augmented neural network that is immediately adjacent to the output layer of the augmented neural network. Illustratively, the augmented neural network may include the parameters (e.g., weights and/or biases) associated with these connections. The augmented machine learning model can therefore determine a probability of purchase of the new item by a user using a purchase history of the user with respect to existing items. Thus, the augmented machine learning model may determine a probability of purchase of the new item without being generated using behavior information associated of the new item. Such probability of purchase of the new item may be useful in item recommendation generations when no purchase histories of users of the new item may exist. For example, an electronic commerce website may recommend a new item using the augmented machine learning model without it being generated using behavior information associated with the new item.

Various aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrative only, and are not intended to be limiting. For example, certain aspects of the disclosure will be described using a particular machine learning model, such as a NN, for purposes of illustration only. For brevity, these aspects may not be described with respect to each possible machine learning model that may be used. In practice, however, many or all of the aspects of the disclosure may apply to other machine learning models, including but not limited to those described herein. In addition, although certain examples and embodiments will be described with respect to generating an augmented machine learning model that has some or all parameters of a corresponding or existing machine learning model, in practice the corresponding or existing machine learning model may be modified or augmented to include new parameters (e.g., a new model may not be generated separately from the existing model, but rather the existing model may itself be modified to include additional parameters).

Examples of machine learning models that may be used with aspects of this disclosure include classifiers and non-classification machine learning models, artificial neural networks (NNs), linear regression models, logistic regression models, decision trees, support vector machines (SVMs), Naïve or a non-Naïve Bayes network, k-nearest neighbors (KNN) models, k-means models, clustering models, random forest models, or any combination thereof.

Example Augmented Artificial Neural Network

Generally described, NNs, including but not limited to deep neural networks ("DNNs"), have multiple layers of nodes. Illustratively, a NN may include an input layer, an output layer, and any number of intermediate, internal, or "hidden" layers between the input and output layers. The individual layers may include any number of separate nodes. Nodes of adjacent layers may be logically connected to each other, and each logical connection between the various nodes of adjacent layers may be associated with a respective weight. Conceptually, a node may be thought of as a computational unit that computes an output value as a function of a plurality of different input values. Nodes may be considered to be "connected" when the input values to the function associated with a current node include the output of functions associated with nodes in a previous layer, multiplied by weights associated with the individual "connections" between the current node and the nodes in the previous layer. When a NN is used to process input data in the form of a matrix of input vectors (e.g., a batch of training data input vectors), the NN may perform a "forward pass" to generate a matrix of output vectors. The input vectors may each include N separate data elements or "dimensions," corresponding to the N nodes of the NN input layer (where N is some positive integer). Each data element may be a value, such as a floating-point number or integer. The forward pass includes multiplying the matrix of input vectors by a matrix representing the weights associated with connections between the nodes of the input layer and nodes of the next layer, and applying an activation function to the results. The process is then repeated for each subsequent NN layer.

The parameters of a NN can be set in a process referred to as training. For example, a NN may be designed for item recommendation generations. The NN may be trained using training data that include purchase histories of existing items. The trained NN may perform item recommendation generations for the existing items based on the purchase histories of users of the existing items. For example, a NN-based model can be trained using training data that includes input data and the correct or preferred output of the model for the corresponding input data. Sets of individual input vectors ("mini-batches") may be processed at the same time by using an input matrix instead of a single input vector, which may speed up training. The NN can repeatedly process the input data, and the parameters (e.g., the weight matrices) of the NN can be modified in what amounts to a trial-and-error process until the model produces (or "converges" on) the correct or preferred output.

FIG. 1 is a diagram of an illustrative augmented artificial neural network generated from an illustrative artificial neural network and parameters from a companion, side, or hyper model according to some embodiments. As shown, the example NN 102 has an input layer 104 with a plurality of nodes, one or more internal layers 106 with a plurality of nodes, and an output layer 108 with a plurality of nodes. In some embodiments, as shown, the input vectors 110 and/or the output vectors 112 may each include N separate data elements or "dimensions" (where N is some positive integer). The NN input layer 104 may include N nodes of the NN input layer. In some embodiments, the input vector 110 can include data representing behavior information of a user with respect to a plurality of items. An output vector 112 can include N elements. Each data element of the output vector 112 may be a value, such as a floating-point number or integer. In some embodiments, the elements of the output vector 112 can correspond to a probability of the user purchasing items during a subsequent time period.

Input to a NN, such as the NN 102 shown in FIG. 1, occurs at the input layer 104. A single input to the NN 102 may take the form of an input vector with N data elements, where N is the number of nodes in the input layer 104. The connections between individual nodes of adjacent layers each is associated with a trainable parameter, or weight, that is applied to the value passed from the prior layer node to the activation function of the subsequent layer node. The weights associated with the connections from the input layer 104 to the internal layer 106 it is connected to may be arranged in a weight matrix W1 with a dimension of U×N, where U denotes the number of nodes in an internal layer 106 and N denotes the dimensionality of the input layer 104. The weights associated with the connections from the internal layer 106 (or, if the NN 102 has multiple internal layers, the internal layer that is adjacent to the output layer 108) to the output layer 108 may be arranged in a weight matrix W2, similar to the weight matrix W1. The weight matrix W2 has a dimension of U×N, where U denotes the number of nodes in the internal layer 106 and N denotes the dimensionality of the output layer 108. The model size of the NN 102, in terms of the number of weights, may be 2×U×N. In some embodiments, the internal layer 106 can include a bias node. The bias node may be connected with every node (or some nodes) of the output layer 108, and may therefore be used in computing the values passed from the internal layer 106 to the output layer 108. However, the bias node may not be connected to any node of the input layer 104 (or, if the NN 102 has multiple internal layers, the internal layer that is adjacent to the input layer 106 to which the bias node belongs). In one embodiment, the input vector 110 would be provided to a computer processor that stores or otherwise has access to the weight matrix W1. The processor would then multiply the input vector 110 by the weight matrix W1 to produce an intermediary vector. The processor may multiply the intermediary vector by the weight matrix W2 to generate the output vector 112. Elements of the output vector 112 may be real numbers, for example, in the range [0, 1].

An augmented NN 102' can include parameters of the corresponding NN 102, which is augmented to generate the augmented NN 102'. As shown, the augmented NN 102' has an input layer 104 with a plurality of nodes, one or more internal layers 106 with a plurality of nodes, and an output layer 108' with a plurality of nodes. The plurality of nodes of the input layer 104, the plurality of nodes of the one or more internal layers 106, and the plurality of nodes of the output layer 108' correspond to the plurality of nodes of the input layer 104, the plurality of nodes of the one or more internal layers 106, and the plurality of nodes of the output layer 108 of the corresponding NN 102. The specific number of layers shown in FIG. 1 is illustrative only, and is not intended to be limiting. In some NNs, different numbers of internal layers and/or different numbers of nodes in the input, internal, and/or output layers may be used. For example, in some NNs the layers may have hundreds or thousands of nodes. As another example, in some NNs there may be 1, 2, 4, 5, 10, or more internal layers. In some implementations, each layer may have the same number or different numbers of nodes. For example, the internal layers 106 can include the same number or different numbers of nodes as each other. As another example, the input layer 104 or the output layer 108' can each include more nodes than the internal layers 106. The input layer 104 and the output layer 108' of the augmented NN 102' can include the same number or different numbers of nodes as each other. The output layer 108 of the NN 102 can include N nodes, and the output layer 108' of the augmented NN 102' can include one additional node 118' (shown as a black box), or N+1 nodes. The one additional node 118' of the output layer 108' of the augmented NN 102' corresponds to a new item not associated with behavior information. The number of additional nodes 118' of the output layer 108' of the augmented NN 102' is illustrative only, and is not intended to be limiting. For example, the number of additional nodes of the output layer 108' of the augmented NN 102' can be 2, 4, 5, 10, or more.

In some embodiments, as shown, the input vectors 110 of the augmented NN 102', similar to the input vectors 110 of the NN 102, include N separate data elements or "dimensions" (where N is some positive integer). The augmented NN input layer 104 may include N nodes of the augmented NN input layer. In some embodiments, the input vector 110 of the augmented NN 102', similar to the input vector 110 of the NN 102, can include data representing behavior information of a user with respect to a plurality of items. For example, the elements of the input vector 110 can include a purchase history of a user. As another example, the individual elements of the input vector 110 may correspond to individual items available for purchase, and the individual elements can have values of 0 or 1, where 0 represents the user not having purchased an item during a time period and 1 represents the user having purchased the item during the time period. The purchase history of the user during the time period, such as a day, a week, a month, a year, or several years, can be used to determine a probability of the user purchasing items during a subsequent time period, which may be the same length or of a different length than the purchase history time period. As another example, the elements of the input vector 110 can be 0 or a positive integer, where 0 represents the user not having purchased an item during a time period and a positive integer represents a number of times that the user purchased the item during the time period. In some embodiments, the elements of the input vector 110 can include non-behavior information associated with items. For example, the non-behavior information associated with items can include features of items purchased by the user. Features of items purchased can include a numeric or alphanumeric identifier of the items, a description of the items, the cost of the items, a life expectancy of the items, a category of the items, whether the items are fungible, and/or other characteristics of the items. In some embodiments, the elements of the input vector 110 can include the attributes of the user. For example, the attributes can include the user's age, gender, geographic location, interests, etc. In some embodiments, the input vector 110 can include information other than the specific examples described herein, some combination of different types of information, etc.

In some embodiments, as shown in FIG. 1, an output vector 112' of the augmented NN 102' can include N+1 elements, while the output vector 112 of the NN 102 can include N elements. In the illustrated embodiment, the additional element 122' of the output vector 112' of the augmented NN 102' can include a value or score associated with a new item, such as a value representing or otherwise associated with the probability of purchase of a new item. In contrast, the input vector 110 of the augmented NN 102' does not include a purchase history of the new item, and the output vector 108 of the NN 102 does not include a probability of purchase of the new item. The additional element 122' of the output vector 112' of the augmented NN 102' corresponds to an output of the additional node 118' of the output layer 108' of the augmented NN 102'. The number of additional elements 122' of the output vector 112' of the augmented NN 102' compared to the number of elements of the output vector 112 of the NN 102 is illustrative only, and is not intended to be limiting. For example, the number of additional elements of the output vector 122' of the augmented NN 102' can be 2, 4, 5, 10, 20, or more.

Each data element of the output vector 112' may be a value, such as a floating-point number or integer. In some embodiments, the elements of the output vector 112' can represent, correspond to, or otherwise be associated with a probability of the user purchasing items during a subsequent time period. For example, the elements of the output vector 112' can be 0 or any positive number, representing or otherwise associated with the predicted probability of the user purchasing an item during the subsequent time period. In this example, if the value is greater than some predetermined or dynamically determined threshold, a computing system using the output of the augmented NN 102' can predict that the user will likely purchase the item during the subsequent time period. In some embodiments, the items associated with the top n values (where n is some positive integer, ratio, or percentage) can be selected, based on an ordering of the items by their respective output values.

Input to an augmented NN, such as the augmented NN 102' shown in FIG. 1, occurs at the input layer 104. A single input to the augmented NN 102' may take the form of an input vector with N data elements, where N is the number of nodes in the input layer 104. In some embodiments, multiple input vectors may be input into—and processed by—the NN 102' at the same time. For example, when the NN 102' is used in prediction, a set of input vectors (e.g., a "mini batch") may be arranged as an input matrix. In this example, each row of the input matrix may correspond to an individual training data input vector, and each column of the input matrix may correspond to an individual node of the first layer 104. The data element in any given input vector for any given node of the first layer 104 may be located at the corresponding intersection location in the input matrix.

The connections between the layers of the augmented NN 102' and the associated parameters can include corresponding connections between the layers of the NN 102 and the associated parameters. The connections between individual nodes of adjacent layers are each associated with a trainable parameter, or weight, that is applied to the value passed from a node of the prior layer to an activation function of a node of the subsequent layer. The weights associated with the connections from the input layer 104 to the adjacent internal layer 106 to which it is connected may be arranged in a weight matrix W1 with a dimension of U×N, where U denotes the number of nodes in an internal layer 106 of the augmented NN 102' and N denotes the dimensionality of the input layer 104 of the augmented NN 102. The individual rows in the weight matrix W1 may correspond to the individual nodes in the input layer 104 of the augmented NN 102', and the individual columns in the weight matrix W1 may correspond to the individual nodes in the internal layer 106 of the augmented NN 102'. The weight associated with a connection from any node in the input layer 104 of the augmented NN 102' to any node in the internal layer 106 of the augmented NN 102' may be located at the corresponding intersection location in the weight matrix.

The weights associated with the connections from the internal layer 106 of the augmented NN 102' (or, if the augmented NN 102' has multiple internal layers, the internal layer that is adjacent to the output layer 108' of the augmented NN 102') to the output layer 108' of the augmented NN 102' may be arranged in a weight matrix W2', similar to the weight matrix W2. The weight matrix W2 has a dimension of N×U, and the weight matrix W2' can have a dimension of (N+1)×U, where U denotes the number of nodes in the internal layer 106 of the augmented NN 102', N denotes the dimensionality of the output layer 108 of the NN 102. Compared to the weight matrix W2, the weight matrix W2' includes one additional row of parameters that correspond to the connections between every node (or some subset of nodes) of the internal layer 106 of the augmented NN 102' and the additional node 118' of the output layer 108' of the augmented NN 102'. The model size of the NN 102 and the model size of the augmented NN 102', in terms of the number of parameters, may be 2×U×N and 2×U×N+U, respectively. The additional U parameters of the augmented NN 102' correspond to the connections between every node (or some subset of nodes) of the internal layer 106 of the augmented NN 102' and the additional node 118' of the output layer 108' of the augmented NN 102'. The additional U parameters of the augmented NN 102' can be represented as an additional row of the weight matrix W2' of the augmented NN 102'. In some embodiments, the internal layer 106 of the augmented NN 102', similar to the internal layer 106 of the NN 102, can include a bias node that captures popularities of items. The bias node may be connected with every node (or some subset of nodes) of the output layer 108' of the augmented NN 102'. However, the bias node may not be connected to any node of the input layer 104 of the augmented NN 102'.

In some embodiments, the additional U parameters of the augmented NN 102' that correspond to the connections between every node (or some nodes) of the internal layer 106 of the augmented NN 102' and the additional node 118' of the output layer 108' of the augmented NN 102' can be determined using a companion machine learning model and other types of data, such as non-behavior or non-event-based information associated with a new item. The companion machine learning model is described in greater detail below with reference to FIG. 2. Briefly, the companion machine learning model can be trained using training data comprising a training data input vector and a corresponding reference data output vector. The training data input vector can comprise data representing non-behavior information (e.g., textual information, visual information, audio information, or metadata) associated with an existing item. The corresponding reference data output vector can comprise parameters of the corresponding NN 102 associated with the existing item.

For example, the corresponding reference data output vector can comprise weights values of the weight matrix W2 associated with the existing item (such as a row of the weight matrix W2 associated with the existing item). Thus, the companion machine learning model may be generated using behavior information associated with the existing item. The trained companion machine learning model can generate the additional U parameters of the augmented NN 102' using non-behavior information associated with the new item. For example, the trained companion machine learning model can generate weights of the additional row of the weight matrix W2' of the augmented NN 102' using an input vector comprising data representing non-behavior information associated with the new item. Thus, the companion machine learning model may determine additional parameters associated with the new item without using behavior information associated with the new item. Such generation of the augmented machine learning model may be useful in the absence of behavior information associated with the new item.

In one embodiment, the input vector 110 of the augmented NN 102' would be provided to a computer processor that stores or otherwise has access to the weight matrix W1. The processor would then multiply the input vector 110 of the augmented NN 102' by the weight matrix W1 to produce an intermediary vector. The processor may adjust individual values in the intermediary vector using an offset or bias that is associated with the internal layer 106 of the augmented NN 102' (e.g., by adding or subtracting a value separate from the weight that is applied). In addition, the processor may apply an activation function to the individual values in the intermediary vector (e.g., by using the individual values as input to a sigmoid function or a rectified linear unit (ReLU) function). The processor may multiply the intermediary vector by the weight matrix W2' to generate the output vector 112' of the augmented NN 102'. The processor may adjust individual values of the multiplication result using an offset or bias that is associated with the output layer 106 of the augmented NN 102' to generate the output vector 112' of the augmented NN 102'. In addition, the processor may apply an activation function to the individual values of the multiplication result, after applying an offset or bias to each individual value of the multiplication result, if any, to generate the output vector 112' of the augmented NN 102'. Elements of the output vector 112' of the augmented NN 102' may be real numbers in the range [0, 1]. Such real numbers may also be referred to as analog values.

A computing system, such as the computing system 600 shown in FIG. 6 and described in greater detail below or some other computing system, may deploy an augmented NN 102' for use in a production computing environment. As shown, the augmented NN 102' may determine a value indicative of a probability of purchase of the new item by a user based on a purchase history of the user with respect to existing items. Thus, the computing system may determine a probability of purchase of the new item for which behavior or other event-based information is not available (e.g., purchase histories of users of the new item) using parameters generated based on non-behavior or other non-event-based information (e.g., textual information, visual information, audio information, or metadata) associated with the new item. Such probability of purchase of the new item may be useful in item recommendation generations when no purchase histories of users of the new item may exist. For example, a computing system of a video streaming website may recommend a new video to users using the augmented machine learning model and behavior information of users associated with other videos.

Figure 2:
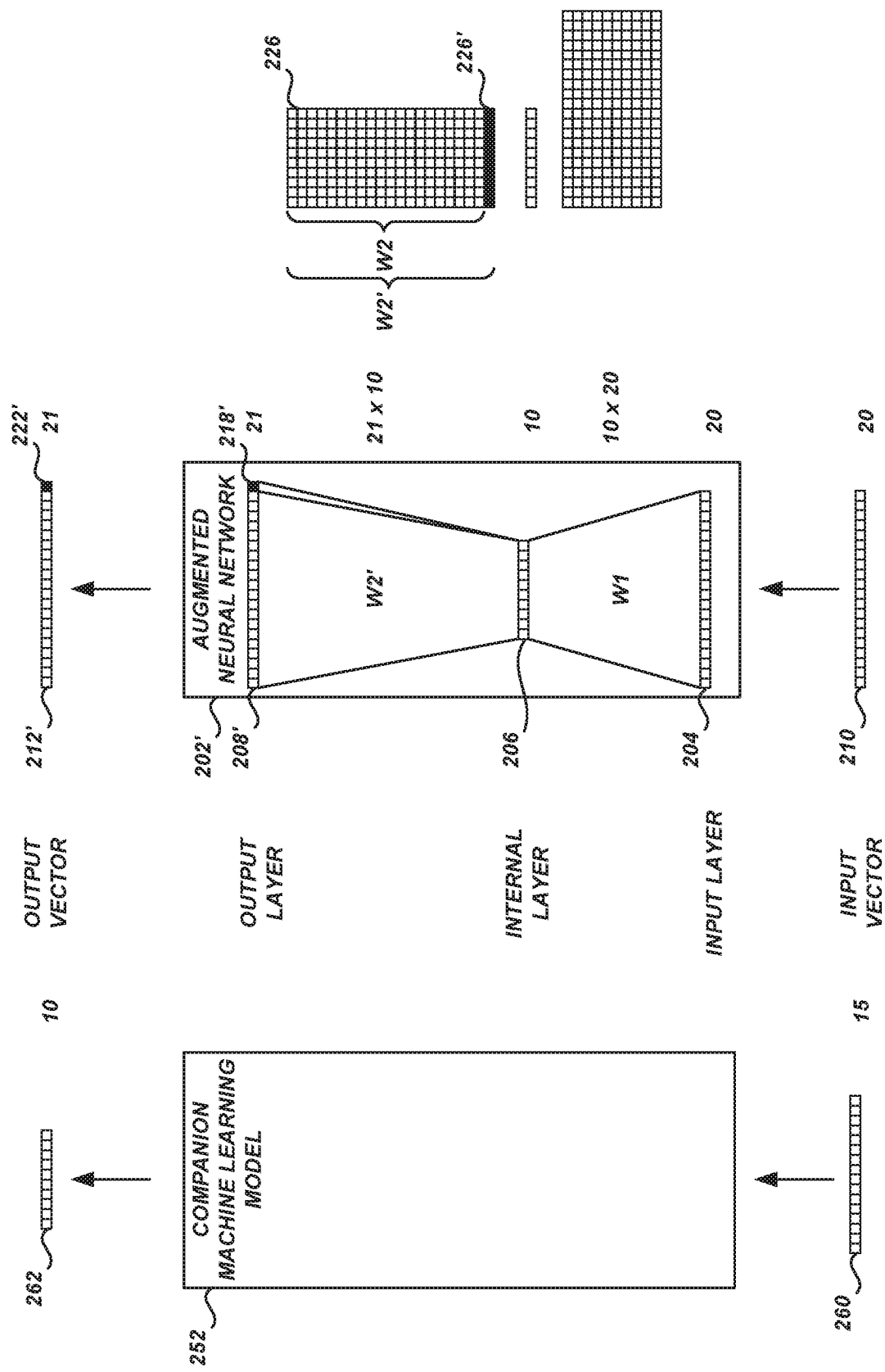
FIG. 2 is an illustrative example process of generating an augmented artificial neural network using a companion machine learning model and non-behavior information according to some embodiments.

Example Augmented Neural Network with Additional Parameters Determined Using a Companion Neural Network FIG. 2 is an illustrative example process of generating an augmented artificial neural network using a companion machine learning model and non-behavior information according to some embodiments. As shown, the NN 202' has an input layer 204 with 20 nodes, one internal layer 206 with 10 nodes, and an output layer 208' with 21 nodes. The specific number of layers shown in FIG. 2 is illustrative only, and is not intended to be limiting. In some NNs, different numbers of internal layers and/or different numbers of nodes in the input, internal, and/or output layers may be used. In some implementations, each layer may have the same number or different numbers of nodes.

In the illustrated example, the input vector 210 includes 20 separate data elements or "dimensions." In some embodiments, the elements of the input vector 210 can include a purchase history of a user with respect to 20 existing items. For example, the elements of the input vector 210 can be 0 or 1, where 0 represents the user not having purchased an item during a time period and 1 represents the user having purchased the item during the time period. In the illustrated example, the output vector 212' includes 21 separate data elements or "dimensions." Each data element of the output vector 212' may be a value, such as a floating-point number or integer. The 21 elements of the output vector 212' can include 20 elements corresponding to, or otherwise representative of, probabilities of purchase of 20 existing items and 1 element 222' corresponding to a probability of purchase of a new item. In some embodiments, the elements of the output vector 212' can correspond to probabilities of the user purchasing the 20 existing items and 1 new item during a subsequent time period. For example, the elements of the output vector 212' can be 0 or any positive number, representing or otherwise associated with the predicted probability of the user purchasing the new item during the subsequent time period. In some embodiments, elements of the output vector 212' may have analog values in the [0, 1] range. If the value is greater than some predetermined or dynamically determined threshold, a computing system using the output of the augmented NN 202' can predict that the user will purchase the item (e.g., the new item) during the subsequent time period. In some embodiments, the items associated with the top n values (where n is some positive integer, ratio, or percentage, such as top 2 items or top 9.5% of the items) can be selected, based on an ordering of the items by their respective output values.

Input to a NN, such as the NN 202' shown in FIG. 2, occurs at the input layer 204. In some embodiments, as shown, a single input to the NN 202' may take the form of the input vector 210. The number of nodes in the input layer 204 and the dimensionality of the input vector 210 may be the same, such as 20. The connections between individual nodes of adjacent layers (e.g., between the input layer 204 and the internal layer 206, or between the internal layer 206 and the output layer 208) are each associated with a trainable parameter, or weight, that is applied to the value passed from the prior layer node to the activation function of the subsequent layer node. The weights associated with the connections from the input layer 204 to the internal layer 206 it is connected to may be arranged in a weight matrix W1 with a dimension of 10×20. The individual rows in the weight matrix W1 may correspond to the individual nodes in the input layer 204, and the individual columns in the weight matrix W1 may correspond to the individual nodes in the internal layer 206. The weight associated with a connection from any node in the input layer 204 to any node in the internal layer 206 may be located at the corresponding intersection location in the weight matrix W1.

The weights associated with the connections from the internal layer 206 to the output layer 208 may be arranged in a weight matrix W2, similar to the weight matrix W1. The weights associated with the connections from the internal layer 206 to the output layer 206 it is connected to may be arranged in a weight matrix W2 with a dimension of 21×10. The individual rows in the weight matrix W2 may correspond to the individual nodes in the internal layer 206, and the individual columns in the weight matrix W2 may correspond to the individual nodes in the output layer 208'. The weight associated with a connection from any node in the internal layer 206 to any node in the output layer 208 may be located at the corresponding intersection location in the weight matrix W2. For example, the weights associated with connections from every node (or some nodes) in the internal layer 206 to the node 218' corresponding to the new item may be located at the row of weights 226' of the weight matrix W2.

The weights 226' associated with connections from every node (or some nodes) in the internal layer 206 to the node 218' corresponding to the new item may be determined using a companion machine learning model 252. The companion machine learning model 252 can be a NN or another type of machine learning model. The parameters of the companion machine learning model 252 can be set in a process referred to as training. The companion machine learning model 252 can be trained using training data comprising a training data input vector 260 and a corresponding reference data output vector 262 (also referred to as a corresponding training data input vector and a corresponding companion reference data output vector 262). The training data input vector 260 can comprise data representing non-behavior and/or other non-event-based information (e.g., textual information, visual information, audio information, or metadata) associated with an existing item. As illustrated, the training data input vector 260 can have a dimension of 15. The corresponding reference data output vector 262 can comprise parameters 226 of the corresponding NN (e.g., the NN 102 illustrated in FIG. 1) associated with an existing item. For example, the corresponding reference data output vector 262 can comprise weights 226 of the weight matrix W2 associated with the existing item (such as a row of weights 226 the weight matrix W2 associated with the existing item). As illustrated, each row of the weight matrix W2 associated with the existing item has a dimension of 10, and each corresponding training data output vector 262 has the same dimension of 10. The companion machine learning model 252 can repeatedly process the input data, and the parameters (e.g., the weight matrices) of the NN can be modified in what amounts to a trial-and-error process until the model 252 produces (or "converges" on) the referenced output. Thus, the companion machine learning model 252 may be generated using both behavior/event information (e.g., the weights of the NN 102 determined using event-based-information) and non-behavior/non-event-based information associated with the existing item.

The trained companion machine learning model 252 can generate the additional 10 parameters of the augmented NN 202' using non-behavior information associated with the new item. For example, the trained companion machine learning model 252 can generate the 10 weights 226' of the additional row of the weight matrix W2' of the augmented NN 202' using an input vector 260 comprising data representing non-behavior information associated with the new item. Thus, the companion machine learning model 252 may determine additional parameters of the augmented machine learning model 202' associated with the new item without using behavior information associated with the new item. Such generation of the augmented machine learning model may be useful in the absence of behavior information associated with the new item. For example, an electronic commerce web site may desire to recommend the new item to users on its first day of release or even prior to its release.

In some embodiments, a computing system, such as the computing system 600 shown in FIG. 6 and described in greater detail below or some other computing system, may generate and train the companion machine learning model 252 using behavior information associated with existing items and weights of a corresponding NN (e.g., the corresponding machine learning model 102 illustrated in FIG. 1). The trained companion machine learning model 252 can determine additional parameters of the augmented NN 202' (e.g., the weights 226' of the weight matrix W2' associated with the new item) using non-behavior information associated with the new item.

In some embodiments, a computing system, such as the computing system 600 shown in FIG. 6 and described in greater detail below or some other computing system, may deploy the augmented NN 202' for use in a production computing environment. As shown, the augmented NN 202' may determine a probability of purchase of the new item by a user using a purchase history of the user with respect to the existing items. Thus, the computing system may determine a probability of purchase of a new item not associated with behavior information (e.g., purchase histories of users of the new item) using non-behavior information (e.g., textual information, visual information, audio information, or metadata) associated with the new item. Such probability of purchase of the new item may be useful in item recommendation generations when no purchase histories of users of the new item may exist.

Example Process for Generating a Companion Machine Learning Model

Figure 3:
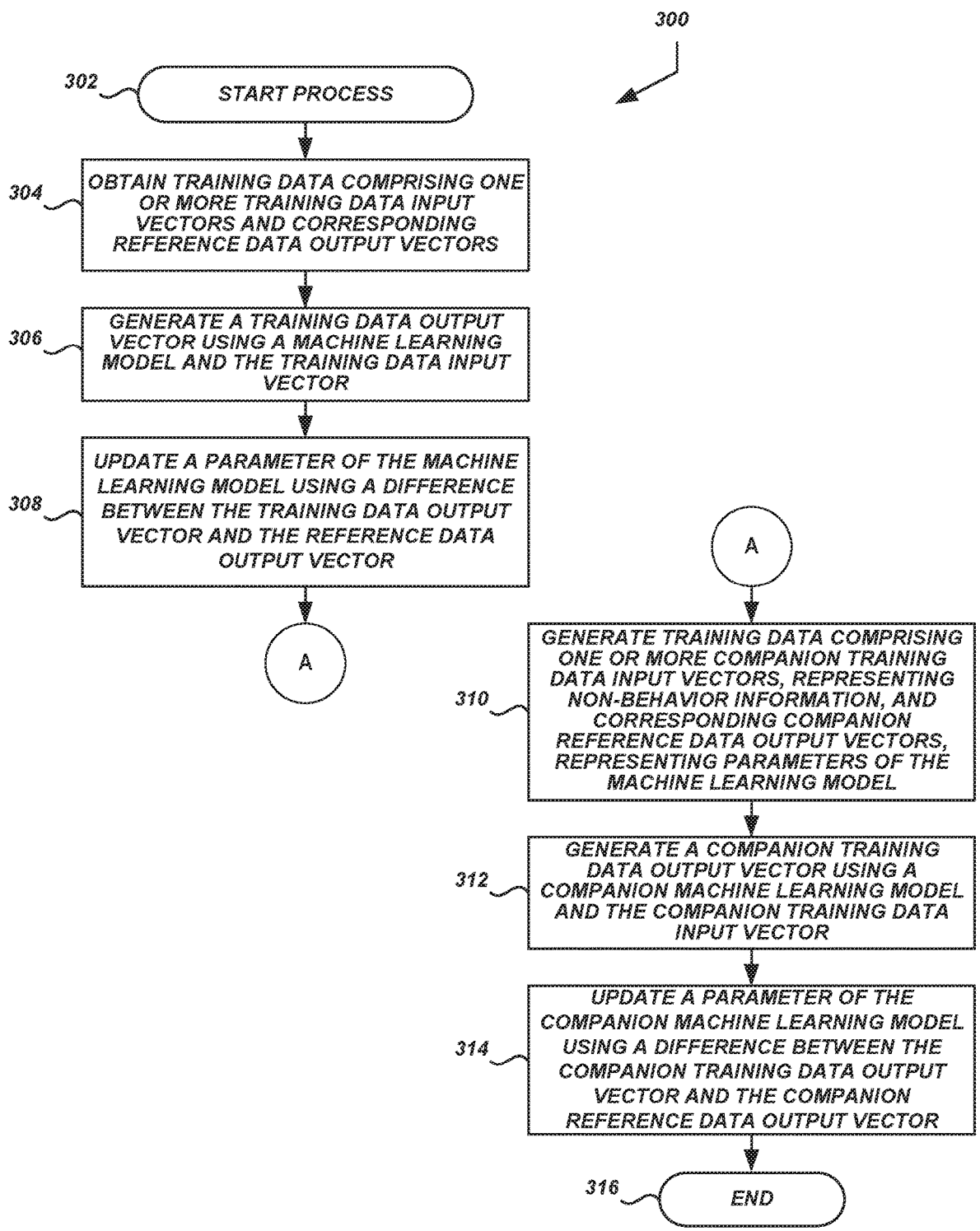
FIG. 3 is a flow diagram of an illustrative process for training a companion machine learning model using non-behavior or other non-event-based information and parameters of a corresponding machine learning model according to some embodiments.

FIG. 3 is a flow diagram of an illustrative process for training a companion machine learning model using non-behavior or other non-event-based information and parameters of a corresponding machine learning model according to some embodiments. Advantageously, the companion machine learning model (e.g., the companion machine learning model 252 illustrated in FIG. 2) can determine additional parameters of an augmented machine learning model (e.g., the augmented NNs 102' and 202' illustrated in FIGS. 1-2 respectively). The parameters may be associated with a new item for which there may be little or no behavior or other event-based information, such as when the new item is newly released or before the new item is released. Furthermore, the augmented machine learning model can determine a score, such as a value representative of a probability of purchase of the new item by a user, based on a purchase history of the user with respect to existing items. Thus, the companion machine learning model can transform non-behavior information (e.g., textual information, visual information, audio information, or metadata) associated with the new item into parameters of the augmented machine learning model associated with the new item. Furthermore, the augmented machine learning model may be generated in the absence of sufficient behavior or other event-based information associated of the new item.

The process 300 begins at block 302. The process 300 may be embodied in a set of executable program instructions stored on a computer-readable medium, such as one or more disk drives, of a computing system, such as the computing system 600 shown in FIG. 6 and described in greater detail below. When the process 300 is initiated, the executable program instructions can be loaded into memory, such as RAM, and executed by one or more processors of the computing system 600. Although the process 300 is described with respect to the computing system 600 shown in FIG. 6, the description is illustrative only and is not intended to be limiting. In some embodiments, the process 300 or portions thereof may be performed serially or in parallel by multiple computing systems.

At block 304, the computing system 600 or some other computing system can in some embodiments obtain training data for use in training a machine learning model, such as the NN 102 shown in FIG. 1. For example, the training data may include input vectors that include feature data for a recommendation process to be performed (e.g., item recommendation generation) or a recognition process to be performed (e.g., automatic speech recognition, facial recognition, handwriting recognition, etc.). Each training data input vector may be associated with a reference data output vector, which is a correct or otherwise expected output. Element of a training data input vector can correspond to data representing a purchase history of a user with respect to a plurality of existing items (e.g., items with available behavior information of users). In some embodiments, the training data can include a plurality of training data input vectors and their corresponding reference data output vectors.

At block 306, the computing system 600 or some other computing system can in some embodiments generate a training data output vector using the machine learning model and the training data input vector (or generate training data output vectors using the machine learning model and the training data input vectors). For example, the computing system 600 can generate a training data output vector that is 20 dimensional from a training data input vector that is 20 dimensional. The corresponding reference data output vector can also be 20 dimensional. The corresponding reference data output vector can be used during the training process to determine how accurate the machine learning model is in processing the training data input vector.

In some embodiments, sets of training data input vectors (e.g., "mini batches") may be arranged as input matrices. Each row of an input matrix may correspond to an individual training data input vector, and each column of the input matrix may correspond to an individual node of the input layer 104 of the NN 102. The data element in any given input vector for any given node of the internal layer 104 may be located at the corresponding intersection location in the weight matrix W1. For example, the training data can represent on-demand video purchase and view histories. There can be 100,000 videos available for purchase or view. Thus, the dimensionality of the training data input vectors and reference data output vectors can be 100,000.

At block 308, the computing system 600 or some other computing system can in some embodiments update a parameter of the machine learning model based on a difference between the training data output vector generated at block 306 and the reference data output vector (or differences between training data output vectors and reference data output vectors). Each training data input vector may be associated with a single correct or expected classification, e.g., the corresponding reference data output vector. The goal of training may to minimize the difference between a training data output vector and the reference data output vector. In some embodiments, the computing system 600 may compute the difference using a loss function, such as a cross-entropy loss function, a L2 Euclidean loss function, a logistic loss function, a hinge loss function, a square loss function, or a combination thereof.

To update a parameter of the machine learning model, the computing system 600 can in some embodiments compute a gradient based on the difference between the training data output vector and the reference data output vector (or differences between the training data output vectors and the reference data output vectors). For example, a derivative, or "gradient," can be computed that corresponds to the direction in which each parameter of the machine learning model is to be adjusted in order to improve the model output (e.g., to produce output that is closer to the correct or preferred output for a given input). The computing system 600 can update some or all parameters of the machine learning model using a gradient descent method. In one embodiment, parameters of the machine learning model (e.g., the weights of the model) are updated using back propagation. In back propagation, a training error is determined using a loss function, and the training error may be used to update the individual parameters of the machine learning model in order to reduce the training error. A gradient may then be computed for the loss function to determine how the weights in the weight matrices are to be adjusted to reduce the error. The adjustments may be propagated back through the NN 102 layer-by-layer. Some example processes for training a NN are described in commonly-owned U.S. patent Ser. No. 14/087,852 titled "DISTRIBUTED TRAINING OF MODELS USING STOCHASTIC GRADIENT DESCENT" and filed on Nov. 22, 2013, the disclosure of which is incorporated by reference herein in its entirety. The computing system 600 can in some embodiments determine whether termination criteria are met. For example, the termination criteria can be based on the accuracy of the machine learning model as determined using the loss function. If so, the process 300 can terminate the training process of the machine learning model and proceed to block 310.

At block 310, the computing system 600 or some other computing system can in some embodiments generate training data for training a companion machine learning model (e.g., the companion machine learning model 252). For example, the training data can include a companion training data input vector and a corresponding companion reference data output vector. Elements of the companion training data input vector (e.g., the companion training data input vector 260 illustrated in FIG. 2) can correspond to data representing non-behavior or other non-event-based information (e.g., textual information, visual information, audio information, or metadata) associated with an existing item (e.g., an item associated with purchase histories of users). Elements of the corresponding companion reference data output vector (e.g., the companion reference data output vector 262 illustrated in FIG. 2) can correspond to parameters associated with the existing item between an output layer of the corresponding machine learning model and an internal layer of the corresponding machine learning model. For example, elements of the companion training data output vector can include the weights 226 of the weight matrix W2 associated with the existing item illustrated in FIG. 2.

At block 312, the computing system 600 or some other computing system can in some embodiments generate a companion training data output vector using the companion machine learning model and the companion training data input vector (or generate companion training data output vectors using the companion machine learning model and the training data input vectors). The dimensionality of the corresponding companion reference data output vector and the companion training data output vector can have the same dimensionality. The corresponding companion reference data output vector can be used during the training process to determine how accurate the companion machine learning model is in processing the training data input vector.

At block 314, the computing system 600 or some other computing system can in some embodiments update a parameter of the companion machine learning model based on a difference between the companion training data output vector generated at block 312 and the companion reference data output vector (or differences between companion training data output vectors and companion reference data output vectors). Each companion training data input vector may be associated with a single correct or expected classification, e.g., the corresponding companion reference data output vector. The goal of training may be to minimize the difference between a companion training data output vector and the companion reference data output vector. In some embodiments, the computing system 600 may compute the difference using a loss function, such as a cross-entropy loss function, a L2 Euclidean loss function, a logistic loss function, a hinge loss function, a square loss function, or a combination thereof.

To update a parameter of the companion machine learning model, the computing system 600 can in some embodiments compute a gradient based on the difference between the companion training data output vector and the companion reference data output vector (or differences between the companion training data output vectors and the companion reference data output vectors). For example, a derivative, or "gradient," can be computed that corresponds to the direction in which each parameter of the companion machine learning model is to be adjusted in order to improve the model output (e.g., to produce output that is closer to the correct or preferred output for a given input). In some embodiments, the computing system 600 can compute the gradient for a subset of the training data, rather than the entire set of training data. Therefore, the gradient may be referred to as a "partial gradient" because it is not based on the entire corpus of training data. Instead, it is based on the differences between the companion training data output vectors and the companion reference data output vectors when processing only a particular subset of the training data.

The computing system 600 can update some or all parameters of the companion machine learning model using a gradient descent method, as described above. The computing system 600 can in some embodiments determine whether termination criteria are met. For example, the termination criteria can be based on the accuracy of the machine learning model as determined using the loss function. If so, the process 300 can terminate at block 316.

Although the steps of the process 300 are shown to be performed sequentially in FIG. 3, this order is illustrative only, and is not intended to be limiting. The process 300 or portions thereof may be performed serially or in parallel by one or more computing systems. In some embodiments, the process 300 can comprise two processes: one process comprising the steps illustrated in blocks 302-308, and another process comprising the steps illustrated in blocks 310-314. The two processes can be performed sequentially, in parallel, synchronously, or asynchronously. The two processes may be performed independently of each other. In some embodiments, one process may be performed once while the other process may be performed multiple times. For example, the process comprising the steps shown in blocks 302-308 may be performed daily or weekly (e.g., when new behavior information becomes available), while the process comprising the steps shown in blocks 310-314 may be performed less frequently (e.g., to train a companion machine learning model when a new product is newly released).

Example Process for Generating and Using an Augmented Machine Learning Model

Figure 4:
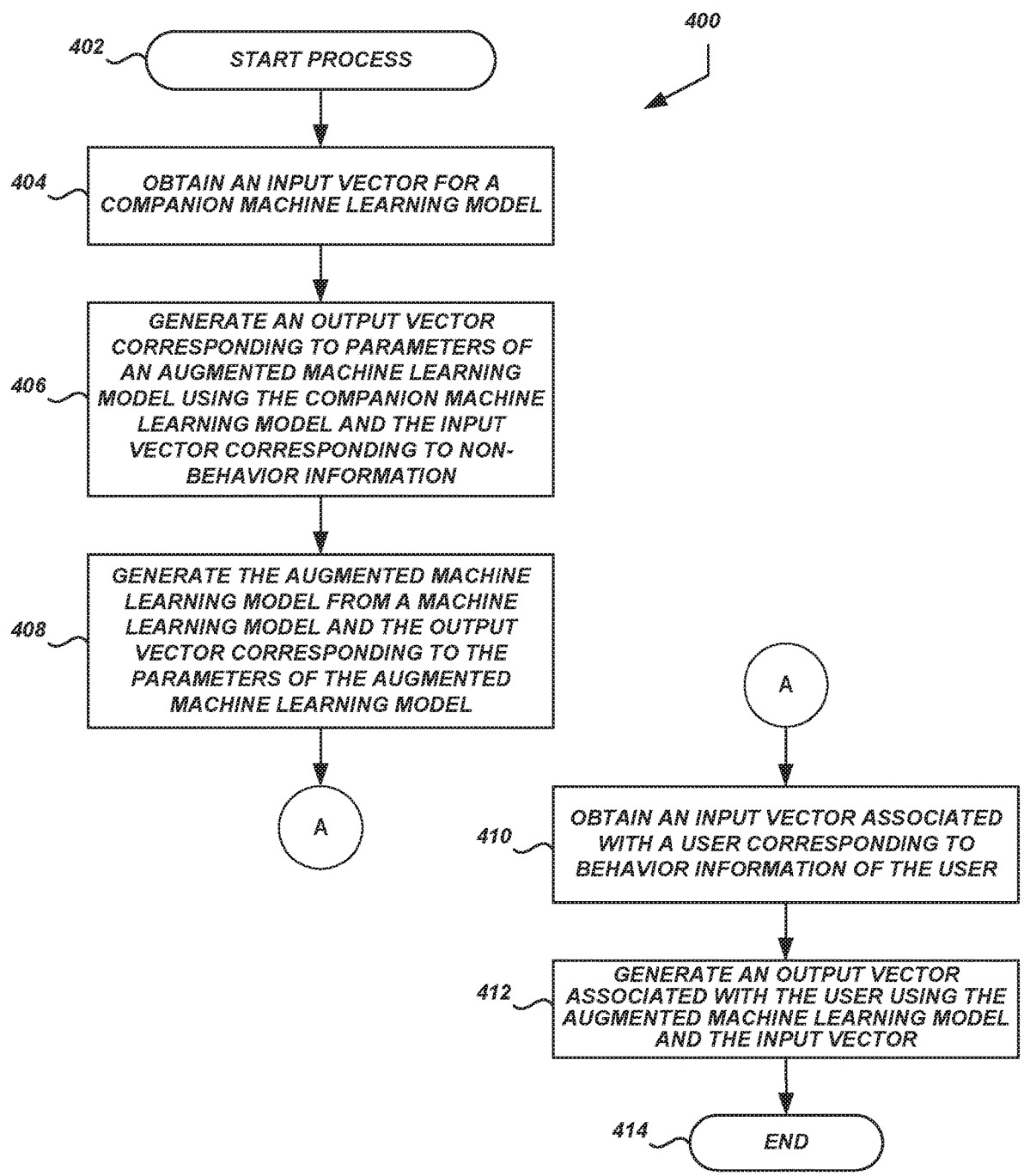
FIG. 4 is a flow diagram of an illustrative process for using an augmented machine learning model generated from a corresponding machine learning model and a companion machine learning model according to some embodiments.

FIG. 4 is a flow diagram of an illustrative process for using an augmented machine learning model generated from a corresponding machine learning model and a companion machine learning model according to some embodiments. The process 400 begins at block 402. In some embodiments, the illustrative process 400 may be implemented following implementation of process 300, discussed above, such that block 402 occurs subsequent to block 316 described above. The process 400 may be embodied in a set of executable program instructions stored on a computer-readable medium, such as one or more disk drives, of a computing system, such as the computing system 600 shown in FIG. 6 and described in greater detail below. When the process 400 is initiated, the executable program instructions can be loaded into memory, such as RAM, and executed by one or more processors of the computing system 600. Although the process 400 is described with respect to the computing system 600 shown in FIG. 6, the description is illustrative only and is not intended to be limiting. In some embodiments, the process 400 or portions thereof may be performed serially or in parallel by multiple computing systems.

At block 404, the computing system 600 or some other computing system can in some embodiments obtain an input vector (e.g., an input vector that corresponds to non-behavior information) for a companion machine learning model. For example, the input vector may contain data that represent non-behavior information (e.g., textual information, visual information, audio information, or metadata) associated with a new item. The new item may not be associated with any purchase behavior, such as purchase histories of users of the new item. For example, an item that is newly released or not released yet may not be associated with purchase histories of users.

At block 406, the computing system 600 or some other computing system can in some embodiments generate an output vector using the companion machine learning model and the input vector corresponding to non-behavior information. For example, elements of the output vector can correspond to the weights 226' associated with connections from every node (or some nodes) in the internal layer 206 of the augmented NN 202' to the node 218' corresponding to the new item. Thus, the companion machine learning model can transform non-behavior information (e.g., textual information, visual information, audio information, or metadata) associated with the new item into parameters of the augmented machine learning model associated with the new item.

At block 408, the computing system 600 or some other computing system can in some embodiments generate the augmented machine learning model from a corresponding machine learning model and the output vector corresponding to the parameters of the augmented machine learning model. For example, the augmented NN 102' can include an input layer 104 with a plurality of nodes, one or more internal layers 106 with a plurality of nodes, and an output layer 108 with a plurality of nodes of the corresponding NN 102 (from which the augmented NN 102' is derived). The augmented NN 102' can also include the connections between the layers of the corresponding NN 102 and parameters associated with the connections. In some embodiments, an augmented machine learning model can include additional parameters determined at block 406. For example, the augmented NN 102' can include the node 118' associated with the new item in the output layer 108' of the augmented NN 102'. The augmented NN 102' can include connections between the node 118' associated with the new item in the output layer 108' of the augmented NN 102' and nodes of the internal layer 106 of the augmented NN 102'. The connections can be associated with additional parameters of the augmented 102' determined at block 406. Thus, the computing system 600 can generate the augmented NN 102' from the corresponding NN 102 by adding a new node 118' to the output layer 108 of the corresponding NN 102, connecting the node 118' to nodes of the internal layer of the corresponding NN 102, and associating the connections with weight values determined at block 406. As another example, the augmented NN 202' can include the node 218' associated with the new item in the output layer 208' of the augmented NN 202'. The augmented NN 102' can include connections between the node 218' associated with the new item in the output layer 208' of the augmented NN 202' and nodes of the internal layer 206 of the augmented NN 202'. The connections can be associated with additional weights 226' of the augmented 202' determined at block 406. Thus, the computing system 600 can generate the augmented NN 202' from a corresponding NN by adding a new row of weights 226' determined at 4 block 406 to the weight matrix W2 of the corresponding NN to generate the weight matrix W2 of the augmented NN 202'.

At block 410, the computing system 600 or some other computing system can in some embodiments obtain an input vector associated with a user that corresponds to behavior information of the user. For example, the input vector can be the input vector 210 that includes a purchase history of the user with respect to existing items that do not include the new item. As another example, the input vector can be the input 110 of the augmented NN 102', which can be the same as the input vector 110 of the corresponding NN 102.

At block 412, the computing system 600 or some other computing system can in some embodiments generate an output vector associated with the user using the augmented machine learning model generated at block 408 and the input vector obtained at block 410. For example, the augmented NN 102' can generate the output vector 112' from the input vector 110. Elements of the output vector 112' can correspond to data representing behavior information of the user with respect to the existing items and the new item. The output vector can include an element 122' that corresponds to a probability of purchase of the new item by the user. As another example, the augmented NN 202' can generate the output vector 212' from the input vector 210. Elements of the output vector 212' can correspond to data representing probabilities of purchase of the existing items and the new item by the user. In this way, the augmented machine learning model can transform behavior information associated with the existing items into predicted behavior information of the user associated with the existing items and the new item. Thus, the predicted behavior information of the user associated with the new item can be determined in the absence of behavior information, or sufficient behavior information associated with the new item. The process 400 can terminate at block 414.

Although the steps of the process 400 are shown to be performed sequentially in FIG. 4, this order is illustrative only, and is not intended to be limiting. The process 400 or portions thereof may be performed serially or in parallel by one or more computing systems. In some embodiments, the process 400 can comprise two processes: one process comprising the steps illustrated in blocks 402-408, and another process comprising the steps illustrated in blocks 410-412. The two processes can be performed sequentially, in parallel, synchronously, or asynchronously. The two processes may be performed independently of each other. In some embodiments, one process may be performed once while the other process may be performed multiple times. For example, the process comprising the steps shown in blocks 402-408 may be performed once (e.g., to generate an augmented machine learning model when a new product is newly released), while the process comprising the steps shown in block 410-412 may be performed more multiple times (e.g., to determine product recommendations using an augmented machine learning model when users access an electronic commerce website).

Operating Environment

Figure 5:
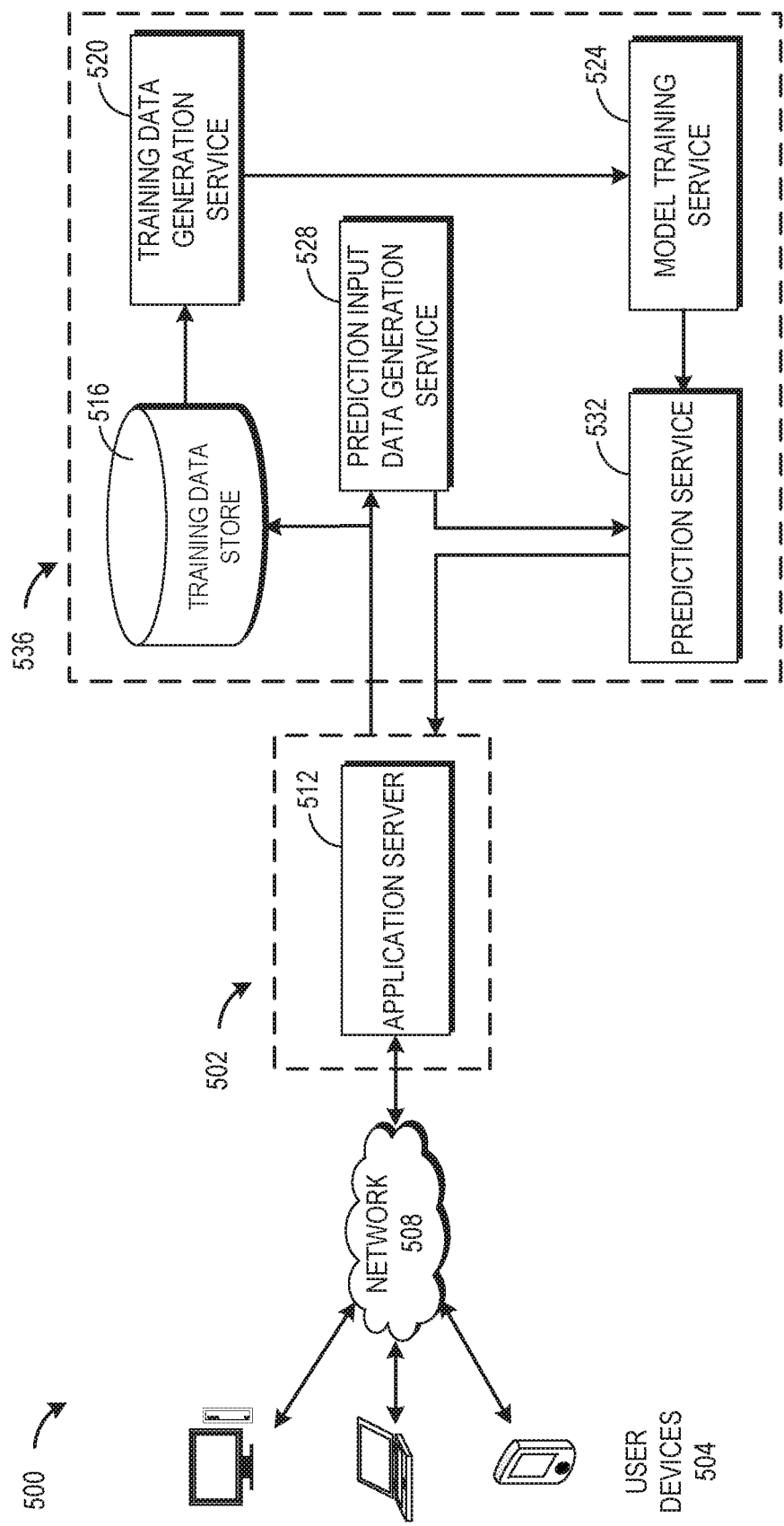
FIG. 5 is a block diagram depicting an illustrative operating environment for generating an augmented machine learning model and generating predictions using the generated modified machine learning model according to some embodiments.

FIG. 5 is a block diagram depicting an illustrative operating environment 500 used in some embodiments for learning an outcome prediction model and generating predictions using the learned outcome prediction model. The illustrative operating environment 500 shown in FIG. 5 includes an electronic commerce system that enables users to browse items (such as items listed in an electronic catalog for purchase) using user devices 504 through a communication network 508. The electronic commerce system 504 may also provide users with recommendations. In some embodiments, the computing system 502 may provide content streaming services to users. As will be appreciated, a retail service and/or a streaming service are simply provided as examples. Aspects of the present disclosure are applicable to a large number of other environments where other types of predictions or other determinations may be made using a machine learning model.

In some embodiments, the electronic commerce system 502 may include an application server 512 (for example, a retail server, or a streaming server) that provides users with an electronic catalog of items for purchases. The application server 512 may facilitate electronic browsing and purchasing of items using various user devices, such as user computing devices 504 (which may alternatively be referred to herein as client computing devices), through the communication network 508. The application server 512 is generally responsible for providing front-end communication with various user devices, such as a user computing device 504, via the network 508. The front-end communication provided by the application server 512 may include generating text and/or graphics, possibly organized as a user interface using hypertext transfer or other protocols in response to information inquiries received from the various user devices 504.

User computing devices 504 may be any of a number of computing devices that are capable of communicating over a network including, but not limited to, a laptop, personal computer, personal digital assistant (PDA), hybrid PDA/mobile phone, mobile phone, smartphone, electronic book reader, digital media player, tablet computer, gaming console or controller, kiosk, augmented reality device, other wireless device, set-top or other television box, and the like.

In the environment 500 shown in FIG. 5, a user of the electronic commerce system 502 may utilize a user computing device 504 to communicate with the application server 512 (for example, a retail server) via the communication network 508, such as the Internet or other communications link. The network 508 may be any wired network, wireless network or combination thereof. In addition, the network 508 may be a personal area network, local area network, wide area network, cable network, satellite network, cellular telephone network, etc., or combination thereof. For example, the network 508 may be a publicly accessible network of linked networks, possibly operated by various distinct parties, such as the Internet. In some embodiments, the network 508 may be a private or semi-private network, such as a corporate or university intranet. The network 308 may include one or more wireless networks, such as a Global System for Mobile Communications (GSM) network, a Code Division Multiple Access (CDMA) network, a Long Term Evolution (LTE) network, or some other type of wireless network. The network 508 may use protocols and components for communicating via the Internet or any of the other aforementioned types of networks.

In some embodiments, the application server 512 may be connected with or in communication with a training data store 516, which may store training data. Training data may include account information, purchase history, browsing history, item reviews and ratings, personal information, location information, billing information, and/or other information, depending on the embodiment. The training data store 516 may include information regarding users' previous actions, such as previous purchases. The application server 512 may provide indications of user actions with respect to the application server 512 to the training data store 516.

In some embodiments, the training data store 516 may be local to the electronic commerce system 502, may be remote from the electronic commerce system 502, and/or may be a network-based service itself. The illustrated data store may be embodied in hard disk drives, solid state memories, any other type of non-transitory computer-readable storage medium, and/or a file, a database, a relational database, in-memory cache, and/or stored in any such non-transitory computer-readable medium accessible to the application server 512 and/or a training data generation service 520. The data store 516 may also be distributed or partitioned across multiple local and/or storage devices, or combined into a single storage device, without departing from the spirit and scope of the present disclosure.

The training data generation service 520 may be connected to or in communication with the training data store 516. The training data generation service 520 may send instructions to the training data store 516 that provide the training data store 516 with the criteria for creating the training data. In some embodiments, instead of providing the training data store 516 with the criteria for creating the training data, the training data generation service 520 may generate training data from the data received from the training data store 516. The training data generation service 520 may provide a model training service 524 with training data, which the model training service 524 may use to learn a corresponding machine learning model (such as the neural network 102), a companion machine learning model (such as the companion machine learning model 252), and/or an augmented machine learning model (such as the augmented NN 102' and the augmented NN 202'). The model training service 524 may provide the augmented machine learning model to a prediction service 532.

In some embodiments, after observing a user action (such as item purchases, page views and/or other actions) of a user, the application server 512 may provide the observed user action with respect to the application server 512 to a prediction input data generation service 528. The prediction input data generation service 528 may process the observed user action into a format suitable for the prediction service 532 to determine, for the user, a recommendation. For example, the data generation service 528 may process the observed user action into an input vector. The prediction service 532 may determine, for the user, a recommendation based on the machine learning model received from the model training service 524 and processed observed user action received from the prediction input data generation service 528. For example, the prediction service 532 may, for the user, generate an input vector, which the prediction service 532 uses in turn to generate an output vector using the augmented machine learning model. Even though the input vector does not include a purchase history of the user with respect to a new item, the output vector can include data corresponding to a probability of purchase of the new item by the user. The prediction service 532 may then use the output vector to determine, for the user, a recommendation.

In some embodiments, training data generated by the training data generation service 520 and the data used in prediction processed by the prediction input data generation service 528 may be similarly formatted. For example, the training data and the processed observed user action may have the same level of granularity with respect to the products purchased or viewed, videos watched, music listened, or services subscribed to.

In some embodiments, as depicted in FIG. 5, a prediction computing system 536 may implement the training data store 516, the training data generation service 520, the model training service 524, the prediction input data generation service 528, and the prediction service 532. In some implementations, the data store 516 and the services may be components of one computing system. In other embodiments, the prediction computing system 536 may operate in a distributed computing environment including several computer systems that are interconnected using one or more computer networks. The prediction computing system 536 could also operate within a computing environment having a fewer or greater number of devices or services than are illustrated in FIG. 5. Thus, the depiction of prediction computing system 536 in FIG. 5 should be taken as illustrative and not limiting to the present disclosure. For example, the prediction computing system 536 could implement various web services components and/or peer-to-peer network configurations to implement at least a portion of the processes described herein.

In some embodiments, the services provided by the prediction computing system 536 may be implemented as one or more web services consumable via the network 508. For example, after observing a plurality of user actions for a plurality of users (such as item purchases, page views and/or other actions), the application server 512 may provide the observed user actions with respect to the application server 512 to the prediction computing system 536 for training a machine learning model. The application server 512 can provide a plurality of observed user actions for the prediction service 532 to determine recommendations for users based on the machine learning model. The prediction computing system 536 can receive observed user actions for training the machine learning model and determining recommendations via web services. In further embodiments, the prediction computing system 536 (or individual components thereof) is provided by one more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

Execution Environment

Figure 6:
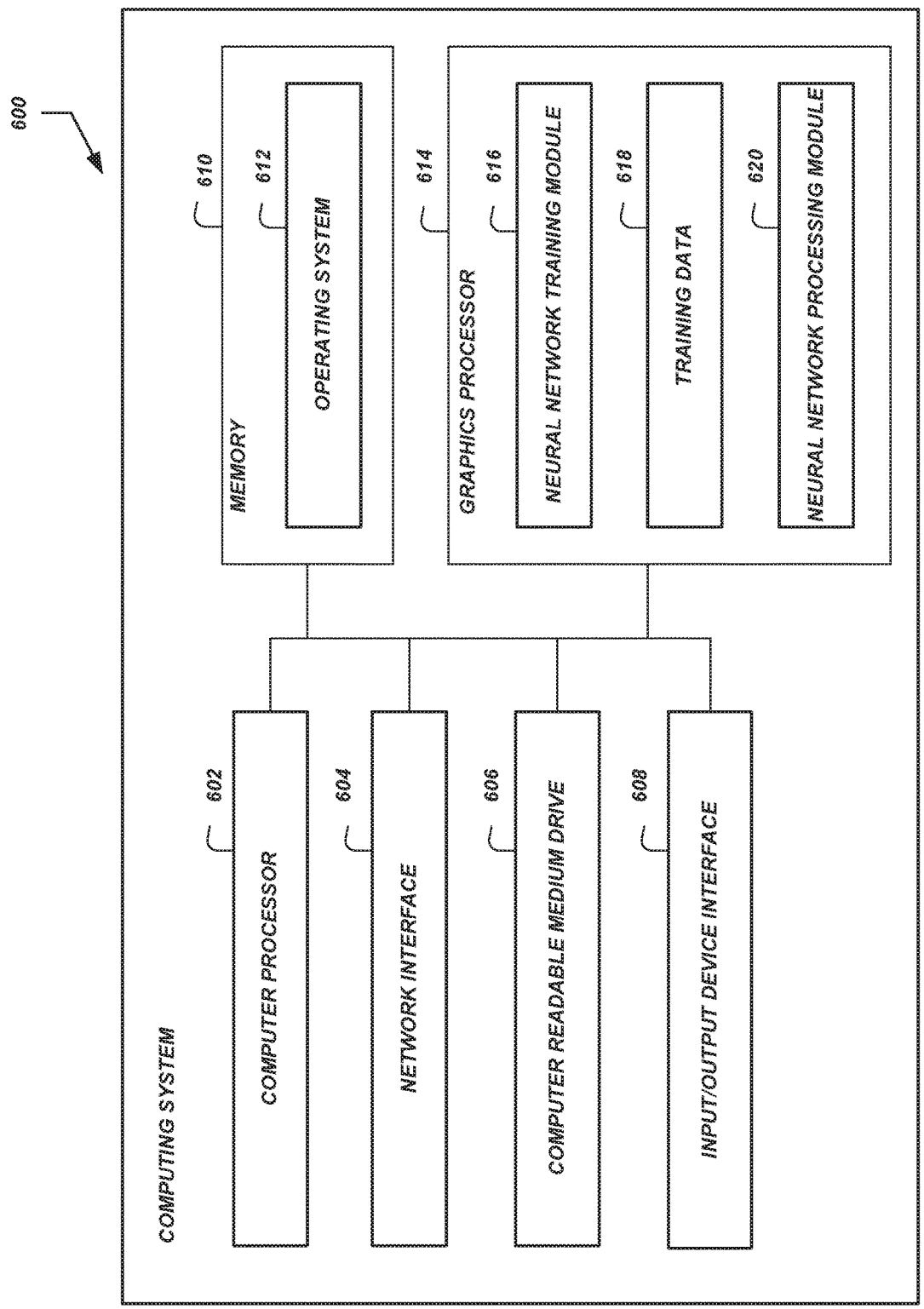
FIG. 6 is a block diagram of an illustrative computing system configured to implement training and processing of artificial neural networks according to some embodiments.

FIG. 6 illustrates an example computing system 600 that may be used in some embodiments to execute the processes and implement the features described above. In some embodiments, the computing system 600 may include: one or more computer processors 602, such as physical central processing units ("CPUs"); one or more network interfaces 604, such as a network interface cards ("NICs"); one or more computer readable medium drives 606, such as high density disks ("HDDs"), solid state drives ("SDDs"), flash drives, and/or other persistent non-transitory computer-readable media; an input/output device interface 608, such as an IO interface in communication with one or more microphones; one or more computer readable memories 610, such as random access memory ("RAM") and/or other volatile non-transitory computer-readable media; and one or more graphical processors 614, such as graphics processing units ("GPUs").

The network interface 604 can provide connectivity to one or more networks or computing systems. The computer processor 602 can receive information and instructions from other computing systems or services via the network interface 604. The network interface 604 can also store data directly to the computer-readable memory 610. The computer processor 602 can communicate to and from the computer-readable memory 610, execute instructions and process data in the computer readable memory 610, etc.

The computer readable memory 610 may include computer program instructions that the computer processor 602 executes in order to implement one or more embodiments. The computer readable memory 610 can store an operating system 612 that provides computer program instructions for use by the computer processor 602 in the general administration and operation of the computing system 600. The computer readable memory 610 can further include computer program instructions and other information for implementing aspects of the present disclosure.

In some embodiments, the graphics processor 614 can include graphics memory such as random access memory ("RAM"). The graphics memory may include a NN and/or computer program instructions that the graphics processor 614 executes in order to implement one or more embodiments. For example, in one embodiment, the graphics memory may include a neural network training module 616 that performs the process 300 described above (or portions thereof) to obtain, generate, or otherwise process training data 618 and train a corresponding neural network and a companion neural network with the obtained, generated, or otherwise processed training data. The neural network training module 616 that performs portions of the process 400 described above to obtain, generate, or otherwise process training data 618 and generate an augmented neural network with the obtained, generated, or otherwise processed training data. In some embodiments, the training data 618 currently being processed by the NN may also be stored in the graphics memory, while the remainder of the training data can be stored in some other location, such as memory 610, a computer-readable medium drive 606, a network-accessible data store, etc. As another example, the graphics memory may include a neural network processing module 620 that performs the process portions of the process 400 described above to process the augmented neural network generated by, for example, the neural network training module 616. In some implementations, the computing system 600 can include both the neural network training module 616 and the neural network processing module 620. In some implementations, the computing system 600 can include one of the neural network training module 616 or the neural network processing module 620. In some embodiments, multiple computing systems 600 may communicate with each other via their respective network interfaces 604, and can implement neural network training or processing separately (e.g., each computing system 600 may execute one or more separate instances of the processes 300 and/or 400), in parallel (e.g., each computing system 600 may execute a portion of a single instance of a process 300 and/or 400), etc.

TERMINOLOGY

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
    computer-readable memory storing executable instructions; and
    one or more hardware-based processors programmed by the executable instructions to at least:
        obtain training data for an artificial neural network, wherein the training data for the artificial neural network comprises a training data input vector and a corresponding reference data output vector, and wherein an element of the reference data output vector corresponds to data representing a behavior of a first user with respect to a first item;
        generate a training data output vector using the artificial neural network and the training data input vector;
        update a weight of the artificial neural network using a difference between the training data output vector and the reference data output vector;
        generate training data for a companion neural network, wherein the training data for the companion neural network comprises a companion training data input vector and a corresponding companion reference data output vector, wherein an element of the companion training data input vector corresponds to data representing non-behavior information associated with the first item, and wherein an element of the companion training data output vector corresponds to a weight, associated with the first item, between an output layer of the artificial neural network and an internal layer of the artificial neural network;
        generate a companion training data output vector using the companion neural network and the companion training data input vector;
        train the companion neural network using the companion training data output vector and the companion reference data output vector to determine a value of the weight, associated with the first item, between the output layer of the artificial neural network and an internal layer of the artificial neural network;
        obtain an input vector associated with a second item, wherein an element of the input vector corresponds to data representing non-behavior information associated with the second item;
        generate an output vector associated with the second item using the companion neural network and the input vector; and
        generate an augmented artificial neural network using the artificial neural network and the output vector associated with the second item,
            wherein an output layer of the augmented artificial neural network comprises (1) the output layer of the artificial neural network and (2) an additional output layer element associated with the second item,
            wherein an internal layer of the augmented artificial neural network comprises the internal layer of the artificial neural network, and
            wherein weights between the internal layer of the augmented artificial neural network and the output layer of the augmented artificial neural network comprise (1) weights between the internal layer of the artificial neural network and the output layer of the artificial neural network, and (2) an additional weight, comprising a value from the output vector associated with the second item, between the internal layer of the artificial neural network and the additional output layer element.

2. The system of claim 1, wherein the instructions to generate the augmented artificial neural network comprises instructions to:
associate a value, of the output vector associated with the second item, with a weight of the augmented artificial neural network between the additional output layer element and an element of the internal layer of the augmented artificial neural network, wherein the element of the internal layer of the augmented artificial neural network corresponds to an element of the internal layer of the artificial neural network.

3. The system of claim 1, wherein the one or more processors are further programmed by the executable instructions to at least:
obtain an input vector associated with a second user, wherein an element of the input vector associated with the second user corresponds to data representing a behavior of the second user; and
generate an output vector associated with the second user using the augmented artificial neural network and the input vector of the second user, wherein a value of the additional output layer element corresponds to data representing a predicted behavior of the second user with respect to the second item.

4. The system of claim 3, wherein no element of the reference data output vector corresponds to behavior of the first user with respect to the second item, and wherein no element of the input vector of the second user corresponds to behavior of the second user with respect to the second item.

5. The system of claim 3, wherein the instructions to generate the output vector associated with the second user using the augmented artificial neural network and the input vector associated with the second user comprise instructions to compute a probability of purchase of the second item by the second user using the augmented artificial neural network and the input vector associated with the second user.

6. A computer-implemented method comprising:
under control of a computer system comprising one or more hardware processors configured to execute specific computer-executable instructions,
obtaining a first machine learning model trained using first training data, wherein the first training data comprises a first type of data representing an event associated with a first item;
generating second training data comprising a companion training data input vector and a corresponding companion reference data output vector, wherein the companion training data input vector comprises a second type of data representing non-event-based information associated with the first item, and wherein an element of the companion reference data output vector corresponds to a weight of the first machine learning model associated with the first item;
training a second machine learning model using the second training data, wherein training the second machine learning model comprises generating a companion training data output vector from the companion training data input vector comprising an estimate of the element of the companion reference data output vector;
obtaining an input vector associated with a second item;
generating an output vector associated with the second item using the second machine learning model and the input vector associated with the second item; and
generating an augmented machine learning model using the first machine learning model and the output vector associated with the second item.

7. The computer-implemented method of claim 6, wherein generating the second training data comprises excluding from the second training data a companion training data input vector associated with the second item.

8. The computer-implemented method of claim 6, wherein training the second machine learning model using the second training data comprises:
generating a companion training data output vector using a non-classification machine learning model;
computing a difference between the companion training data output vector and the companion reference data output vector; and
updating a parameter of the non-classification machine learning model using the difference.

9. The computer-implemented method of claim 6, wherein training the second machine learning model comprises training at least one of: a neural network, a recurrent neural network (RNN), a linear regression model, a logistic regression model, a decision tree, a support vector machine, a Naïve Bayes network, a k-nearest neighbors (KNN) model, a k-means model, a random forest model, or a combination thereof.

10. The computer-implemented method of claim 6, wherein obtaining a first machine learning model comprises obtaining a first type of machine learning model different than the second machine learning model.

11. The computer-implemented method of claim 6, wherein generating the second training data comprises including, in the companion training data input vector, at least one of: textual information associated with the first item, visual information associated with the first item, audio information associated with the first item, or metadata associated with the first item.

12. The computer-implemented method of claim 6, wherein generating the augmented machine learning model comprises:
associating an element of the output vector with a weight of the augmented machine learning model.

13. The computer-implemented method of claim 12, wherein generating the augmented machine learning model further comprises:
generating an output layer of the augmented machine learning model, wherein the output layer of the augmented machine learning model comprises a corresponding output layer of the first machine learning model;
generating an internal layer of the augmented machine learning model, wherein the internal layer of the augmented machine learning model comprises a corresponding internal layer of the first machine learning model; and
associating weights between the output layer of the augmented machine learning model and the internal layer of the augmented machine learning model with corresponding weights between the output layer of the first machine learning model and the internal layer of the first machine learning model.

14. The computer-implemented method of claim 13, wherein generating the output layer of the augmented machine learning model comprises including a node, associated with the second item, and nodes of the output layer of the first machine learning model.

15. The computer-implemented method of claim 14, wherein associating weights between the output layer of the augmented machine learning model and the internal layer of the augmented machine learning model with corresponding weights between the output layer of the first machine learning model and the internal layer of the first machine learning model comprises:

associating an element of the output vector with a weight of the augmented machine learning model between the node of the output layer of the augmented machine learning model and a node of the internal layer of the augmented machine learning model.

16. The computer-implemented method of claim 12, wherein associating the element of the output vector with the weight of the augmented machine learning model comprises:

associating the element of the output vector with the weight of the augmented machine learning model between a node of an output layer of the augmented machine learning model and a bias node of an internal layer of the augmented machine learning model.

17. The computer-implemented method of claim 12, wherein associating the element of the output vector with the weight of the augmented machine learning model comprises:

associating an element of the output vector with a weight of the augmented machine learning model between a node of an input layer of the augmented machine learning model and a node of an internal layer of the augmented machine learning model.

18. A system comprising:

computer-readable memory storing executable instructions; and one or more processors programmed by the executable instructions to at least:

train a first artificial neural network to estimate at least a subset of weights of a second artificial neural network using non-event-based information, wherein the second artificial neural network is trained using event-based information;

obtain an input vector comprising non-event-based information associated with an item;

generate an output vector comprising the subset of weights of the second artificial neural network using the first artificial neural network and the input vector;

generate the second artificial neural network comprising a first layer and a second layer, wherein the second artificial neural network is configured to generate output associated with the item using event-based information associated with a different item; and associate weights between the first layer and the second layer with values of elements of the output vector.

* * * * *